United States Patent
Sheu et al.

(10) Patent No.: US 7,227,329 B1
(45) Date of Patent: Jun. 5, 2007

(54) WIRE-SAVING OPTICAL ENCODER HAVING SERVOMOTOR IDENTIFICATION INFORMATION

(75) Inventors: Hong-Cheng Sheu, Taoyuan Hsien (TW); Jian-Da Chen, Taoyuan Hsien (TW); Meng-Chang Lin, Taoyuan Hsien (TW); T Cheng-Ping Lin, Taoyuan Hsien (TW)

(73) Assignee: Delta Electronics Inc., Taoyuan (TW)

( * ) Notice: Subject to any disclaimer, the term of this patent is extended or adjusted under 35 U.S.C. 154(b) by 0 days.

(21) Appl. No.: 11/399,320

(22) Filed: Apr. 7, 2006

(51) Int. Cl.
*G05B 19/29* (2006.01)
(52) U.S. Cl. .................. 318/602; 318/640; 318/652
(58) Field of Classification Search ............. 318/602, 318/604, 605, 640, 652, 654, 661, 449–450; 324/244.1; 250/231.14; 341/173, 184, 185, 341/190, 192; 340/870.03
See application file for complete search history.

(56) References Cited

U.S. PATENT DOCUMENTS

| | | | | |
|---|---|---|---|---|
| 5,254,919 A | * | 10/1993 | Bridges et al. ............. 318/560 |
| 5,434,602 A | * | 7/1995 | Kaburagi et al. ........ 346/139 R |
| 5,471,054 A | * | 11/1995 | Watanabe ............... 250/231.13 |
| 5,668,456 A | * | 9/1997 | Nakata et al. .............. 318/602 |
| 5,684,373 A | | 11/1997 | Nakata et al. |
| 6,243,023 B1 | * | 6/2001 | Katagiri ................. 340/870.03 |

FOREIGN PATENT DOCUMENTS

TW          1232631          5/2005

* cited by examiner

*Primary Examiner*—Bentsu Ro

(57) ABSTRACT

A wire-saving optical encoder having servomotor identification information is applied to a wire-saving transmission design to provide a circuit and a method for processing servomotor identification information and encoded feedback control signals. With a microprocessor, a multiplexer and the servomotor identification information stored in the microprocessor, an output device and a driver for the feedback signals of the encoder constitute a wire-saving signal transmitting circuit. The microprocessor and multiplexer switch a signal transmission mode to transmit the servomotor identification information and phase change signal produced by the servomotor control parameters stored in a firmware by a serial output mode, and the same transmitting wire is used to transmit a rotor operating signal after the transmitting mode is switched, so as to save wires and lower costs for transmitting feedback signals and correctly identifying and effectively controlling a servomotor.

10 Claims, 6 Drawing Sheets

WIRE-SAVING OPTICAL ENCODER HAVING SERVOMOTOR IDENTIFICATION INFORMATION

BACKGROUND OF THE INVENTION

1. Field of the Invention

The present invention relates to a servomotor, and more particularly to a servomotor having a wire-saving serial output of servomotor identification information and encoded feedback control signals to improve the match control and misconnection of a diversified servomotor and a driver as well as the control of the servomotor.

2. Description of Prior Art

At present, a servomotor is operated, driven and controlled mainly by related information including motor rotor position, speed and rotating direction required by the servo optical encoder and the feedback driver, and thus a good design or a good control method for an optical encoder and its signal processing circuit can enhance the matching, the control, and the wiring cost between the motor and the driver.

The structure of a traditional servo optical encoder applied to a servomotor usually includes an optical transmitter, an optical receiver, a rotary coding disc, a fixed coding plate, a processing circuit and a mechanical body as disclosed in R.O.C. Pat. No. I232631, and the difference of a servo optical encoder from a general encoder resides on that the servo optical encoder uses the design of tracks on a coding disc 8 for outputting a phase change signal as shown in FIG. 1, in addition to providing a rotor operating signal (A, B, Z), wherein a stripe 81 corresponds to signals A, B, and tracks 82, 83, 84 correspond to phase change signals U, V, W, and a different quantity of magnetic pole rotors of a servomotor corresponds to a different distribution of phase change signals for the digital coding of a disc. Referring to FIG. 2, the digital coding of a disc corresponding to a servomotor having ten magnetic poles further provides a phase change signal (U, V, W), wherein the rotor operating signal (A, B, Z) provides related information including the feedback operating position, speed and loop number to facilitate an accurate control of the driver, and the phase change signal (U, V, W) feeds back the rotor magnetic field position before starting and provides the phase change strategy for the driver, and these signals vary with the quantity of magnetic poles of the servomotor according to the design of the coding disc and the distribution of the pattern.

Further, most of the signals of a prior art servo optical encoder are outputted in pairs as shown in FIG. 3, and a total of 14 wires including the power input is needed, wherein the phase change signal (U, V, W) mainly provides the positions of the magnetic poles of a motor rotor, so that the driver can rotate the motor in the same direction of the magnetic field, and thus the phase change signal (U, V, W) is usually provided before the operation of the motor starts. In other words, the transmission of phase change signals (U, V, W) in pairs through six transmission lines will be idled after the motor is started and operated normally, and thus such arrangement incurs an additional cost for installing the transmission line, and there is a need to save the wires and reduce the cost for the wiring requirement.

U.S. Pat. No. 5,684,373 mainly uses electronic components such as a timer and a multiplexer to send out the phase change signal (U, V, W) after the power is turned on for approximately several hundreds of milliseconds, and then after the signals are transmitted, the same transmission line is used to send out the rotor operating signal (A, B, Z) and feed back the required operating control related information to the driver. Therefore, only eight transmission lines are needed for transmitting signals, so as to save the wiring and lower the cost.

As servomotors become increasingly popular, there are different combinations of driver and motor for different occasions, and motors of different features have different control parameters to control the motors effectively. Particularly, related information for identifying the motor including rated speed, power, external look and geometric size are included into the transmitted signals of the servo optical encoder. With the transmission of such related information, the driver can correspond to the related motor parameters to facilitate the related controls of the motor. On the other hand, the driver also can determine whether or not the motor is matched to avoid a misuse by users. However, the information provided by the prior art servo encoder and the foregoing cited U.S. patent is insufficient, and does not provide additional motor identification related information. If it is necessary to use the general wiring output method adopted by the prior art servo optical encoder to provide additional motor identification related information, then the quantity of wires will be increased accordingly. Of course, the wiring and its cost will be increased as well. As to the foregoing cited U.S. patent that emphasizes on wire-saving, it is necessary to use more electronic components if additional motor identification related information is provided without installing additional wires. Regardless of adopting the processing circuit architecture and signal transmission control method for the wire-saving optical encoder according to the prior art servo optical encoder or the foregoing cited U.S. patent, these prior arts cannot cope with different changes without changing the current existing architecture.

SUMMARY OF THE INVENTION

In view of the foregoing shortcomings of the prior art, the inventor of the present invention based on years of experience in the related industry to conduct experiments and modifications, and finally designed a wire-saving optical encoder in accordance with the present invention to overcome the shortcomings of the prior art structure.

The present invention is to overcome the shortcomings of the prior art and avoid the existing deficiencies by a design of serial signals that shares the same transmission line and collocates with the control of switching signal transmission modes of a microprocessor to feed back the key parameters of the servomotor pre-stored in a firmware and comprised of identification information, phase change signals (U, V, W) and rotor operating signals (A, B, Z) through the same transmission line to the driver. With the change of the firmware to cope with different changes and diversified requirements of feeding back and processing the signals of the optical encoder, the present invention can improve the installation of its transmission lines and provides a more flexible identification for motor pairing and control, so as to provide users a simple, easy and low-price servo optical encoder to cope with the diversified servomotor matching control.

The wire-saving optical encoder having servomotor identification information of the invention comprises an optical transmitter, an optical receiver, a rotary coding disc, a fixed coding plate, a processing circuit and a mechanical body, wherein the processing circuit comprises:

a microprocessor, including a built-in firmware and pre-storing a plurality of servomotor control parameters, and receiving a phase change signal (U, V, W) outputted from an encoder;

a multiplexer, for receiving an output signal from the microprocessor and a rotor operating signal (A, B, Z) outputted by the encoder, and having an input terminal coupled to the multiplexer for receiving an identification driving signal; and a line driver and the output terminal of the multiplexer coupled to the driver;

such that the microprocessor outputs a signal to control the multiplexer to switch the signal transmission mode, and at the first transmission mode, the identification driving signal uses a serial output mode to transmit a motor identification code and a phase change signal produced by the firmware according to the pre-stored motor control parameter, and after the signals are transmitted, the signal transmission mode is switched to a second transmission mode, and the same signal transmission line continues transmitting the rotor operating signal.

The method for feeding back and transmitting signals for a wire-saving optical encoder having servomotor identification information of the invention is a signal transmission control method for a wire-saving processing circuit that comprises a microprocessor, a multiplexer, a phase change signal output element, a rotor operating signal output element, and a driver coupled to the encoder, and the method comprises the steps of:

(a) pre-storing a plurality of servomotor control parameters and firmware into a microprocessor by a burning process in a pre-storing procedure;

(b) the microprocessor receiving a phase change signal (U, V, W) outputted by a phase change signal output element in a power starting procedure;

(c) the microprocessor outputting a control signal to switch the multiplexer at a first transmission mode and collocate the identification driving signal and the clock signal (CLK) to feed back the servomotor ID code and the phase change signal (U, V, W) to the driver through the line driver;

(d) the microprocessor further outputting a control signal to switch the multiplexer at a second transmission mode to receive a rotor operating signal (A, B, Z) outputted by the encoder and feed back an output to the driver through the same transmission line of the line driver.

BRIEF DESCRIPTION OF DRAWINGS

The features of the invention believed to be novel are set forth with particularity in the appended claims. The invention itself however may be best understood by reference to the following detailed description of the invention, which describes certain exemplary embodiments of the invention, taken in conjunction with the accompanying drawings in which:

DETAILED DESCRIPTION OF THE INVENTION

The technical characteristics, features and advantages of the present invention will become apparent in the following detailed description of the preferred embodiments with reference to the accompanying drawings.

Figure 1:
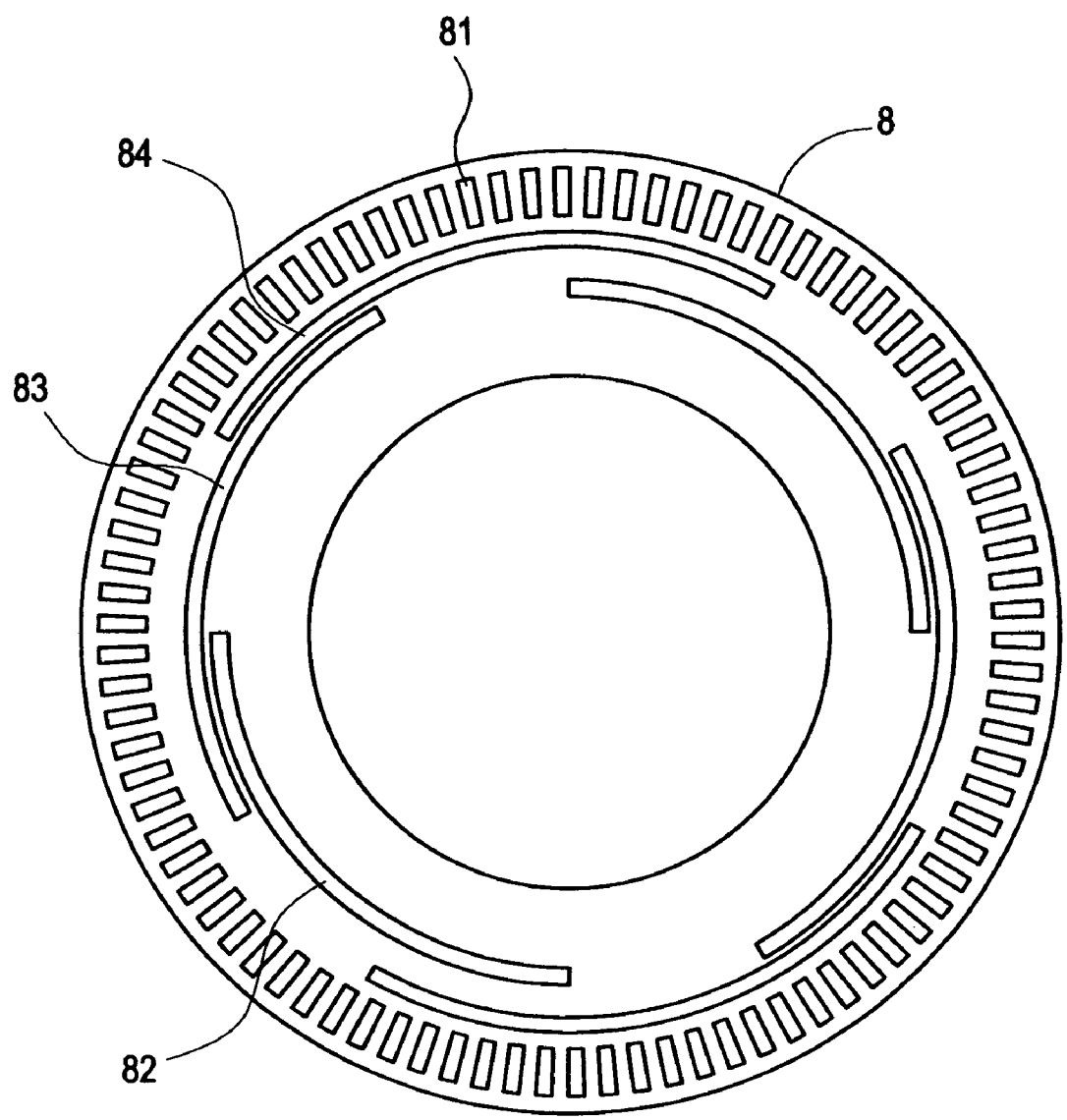
FIG. 1 is a schematic view of a coding disc of a prior art encoder.
Figure 2:
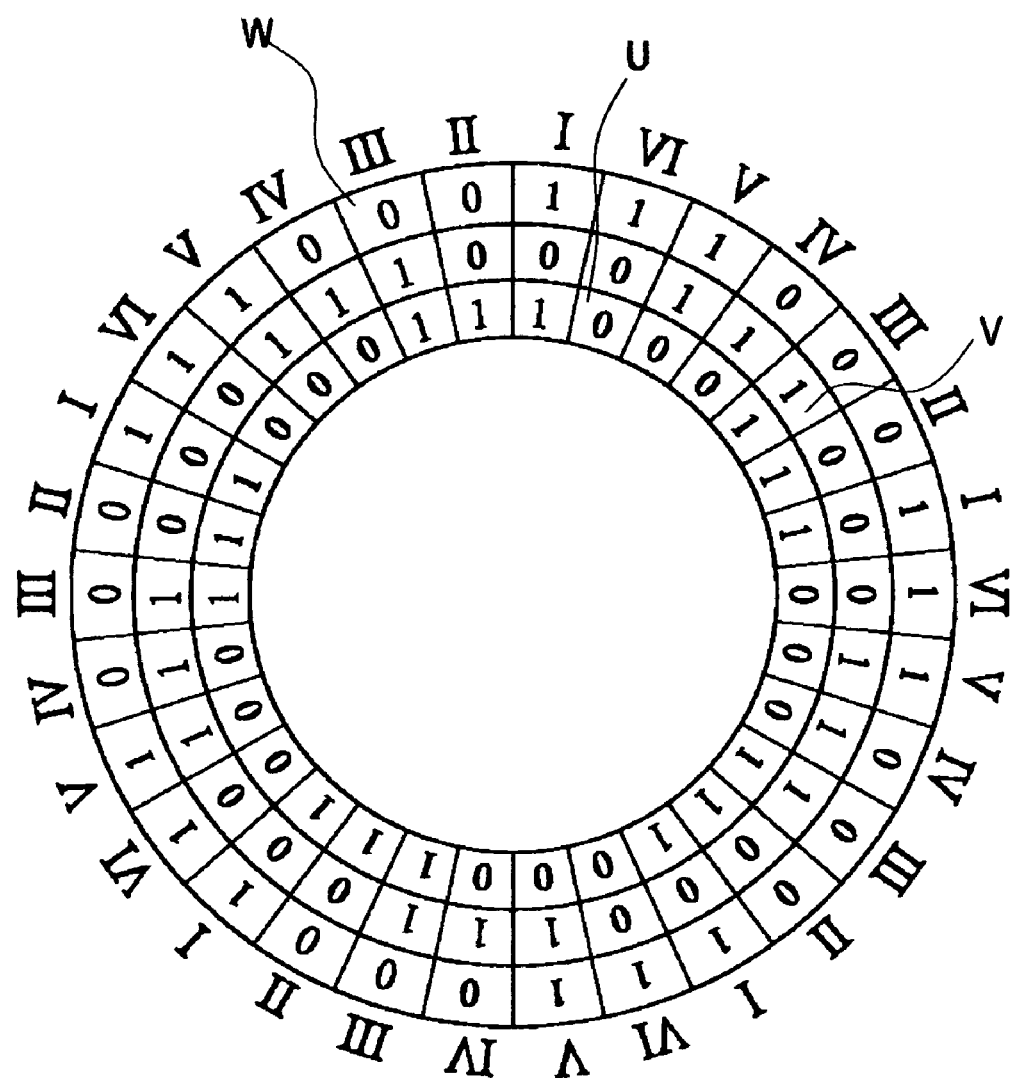
FIG. 2 is a schematic view of the distribution of a phase change signal for an encoder having ten magnetic pole rotors.
Figure 3:
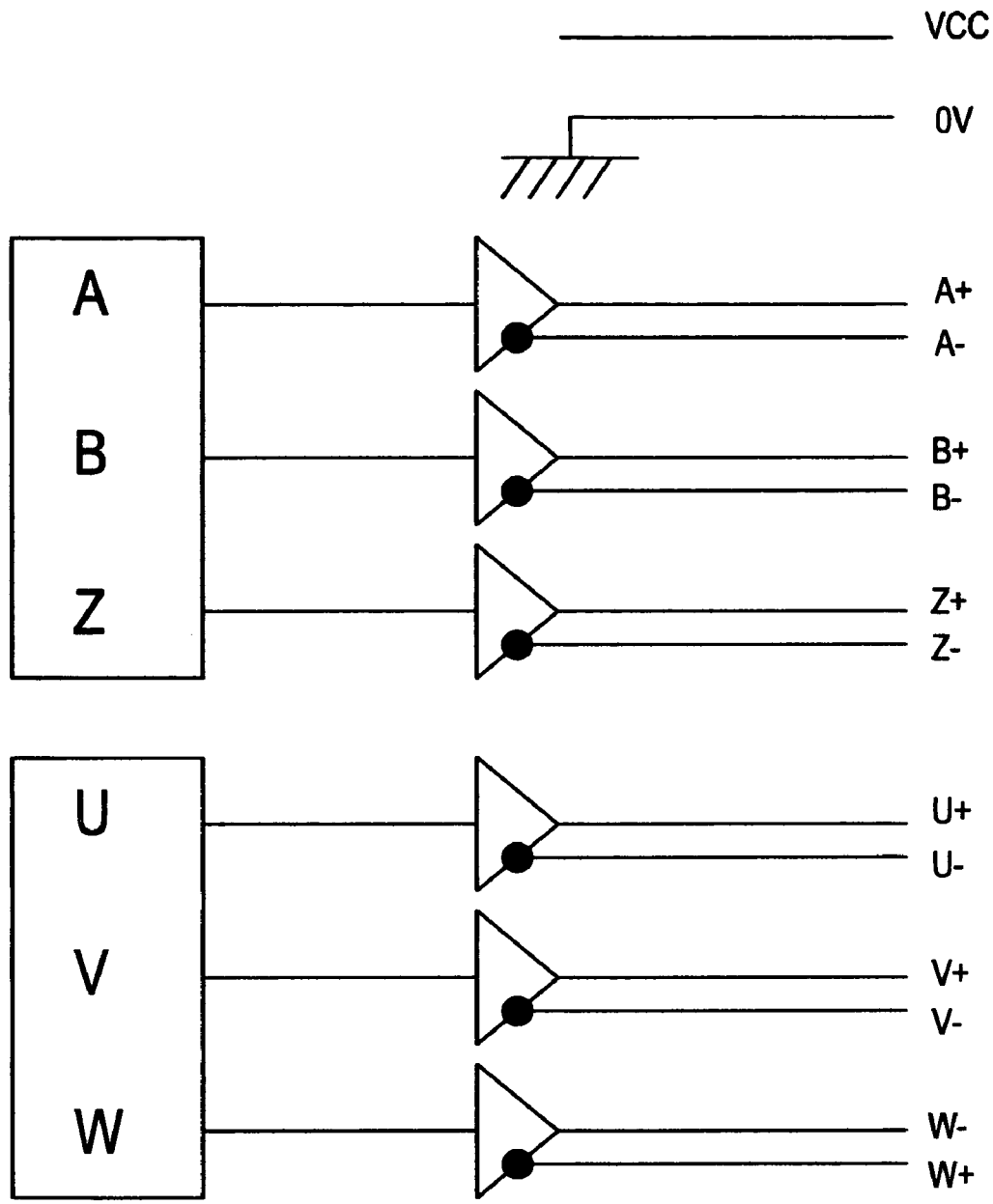
FIG. 3 is a block diagram of the structure of a processing unit of a prior art encoder.
Figure 4:
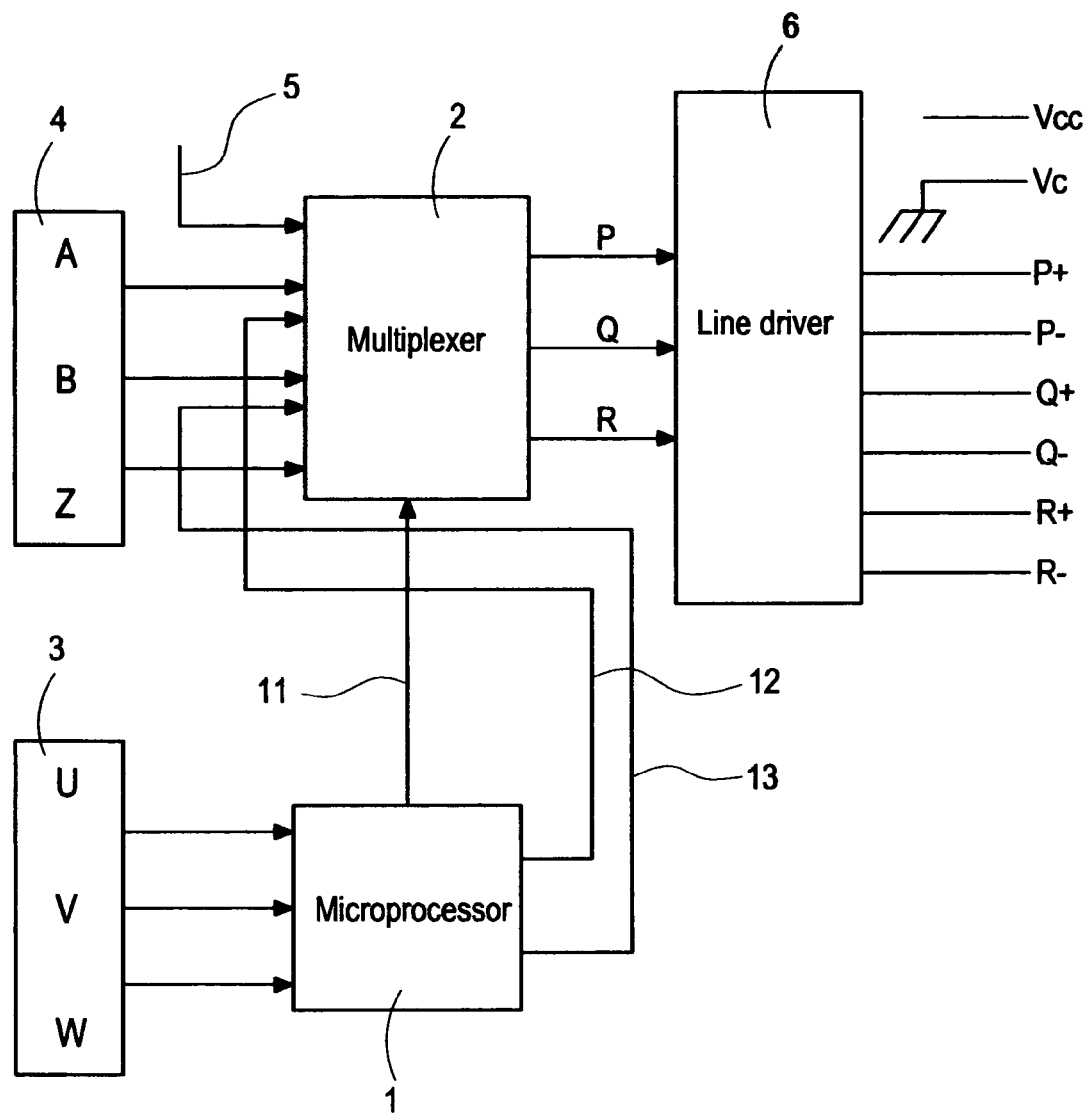
FIG. 4 is a block diagram of the structure of a processing circuit according to a preferred embodiment of the present invention.

Referring to FIG. 4 for the block diagram of a wire-saving optical encoder having servomotor identification information processing circuit in accordance with the present invention, the wire-saving optical encoder has a signal processing circuit comprising a microprocessor 1 and a multiplexer 2, and a signal input terminal of the microprocessor 1 receives a phase change signal (U, V, W) 3 outputted by the encoder, and an input terminal of the multiplexer 2 receives an output signal from an output terminal of the microprocessor 1 and a rotor operating signal (A, B, Z) 4 and an identification driving signal 5 outputted from the encoder, and an output terminal of the multiplexer 2 is connected to a line driver 6 by using 8 transmission lines to connect the driver (not shown in the figure) for the signal transmissions that output the power (VCC) supply pairing signals to save wires, so as to provide an effective control servomotor that can save costs by transmitting control signals with the servomotor identification information and coded feedbacks without changing the existing architecture. The control servomotor also can achieve the effects of transmitting feedback signals, providing a correct identification and providing a foolproof connection.

The microprocessor 1 is a low-price microcontroller (MCU) or a digital signal processing (DSP) microprocessor that uses a burning technology and a procedure to pre-store a plurality of control parameters of the servomotor and builds in a firmware, and the control parameter of the servomotor produces a servomotor ID code that can transmit signals through the multiplexer 2.

The servomotor ID code is a servomotor ID code (ID CODE) encoded and produced by a firmware, and the ID codes include a servomotor model, an operating power, a rated speed (KT), a voltage constant (KE), an armature resistance and an armature inductance. For example, 1. For the motor ID code (ID CODE) is 0×10, its data include:
   a servomotor model of 400W(L):60 mm;
   a rated speed equal to 3000 rpm;
   a maximum speed equal to 5000 rpm;
   a rated current equal to 2.6A;
   a maximum current equal to 7.8A;
   a rotor moment of inertia equal to 0.28×10−4;
   a torque constant-KT equal to 0.50 N-m/A;
   a voltage constant-KE equal to 18.5 mV/RPM;
   an armature resistance equal to 1.77 ohms; and
   an armature inductance equal to 6.71 mH.

2. For motor ID code (ID CODE) is 0×1C, its data include:
   a servomotor model of 750W(L):80 mm;
   a rated speed equal to 3000 rpm;
   a maximum speed equal to 5000 rpm;
   a rated current equal to 5.0A;
   a maximum current equal to 15.0A;
   a rotor moment of inertia equal to 1.14×10−4;
   a torque constant-KT equal to 0.48 N-m/A;

a voltage constant-KE equal to 17.9 mV/RPM;

an armature resistance equal to 0.35 ohm; and an armature inductance equal to 3.09 mH.

By transmitting the servomotor ID code (ID CODE), the driver corresponds to the servomotor identification information and identifies the connected servomotor to facilitate the control of the motor and avoid a connection by mistake.

Of course, the parameters included in the servomotor identification information can have different pre-stored contents according to different models of servomotors and different requirements and directly decided by the firmware to produce the servomotor ID code (ID CODE), and achieve the changes to cope with diversified servomotors without changing the hardware architecture.

The output signal transmitted from the microprocessor 1 to the multiplexer 2 includes a control signal 11, a clock signal (CLK) 12 and a data signal 13, wherein the data signal 13 further includes a data signal serially combined with a servomotor ID code (ID CODE) encoded and produced by the firmware and a phase change signal (U, V, W) 3 received by the encoder.

The multiplexer 2 further includes the setup of a first transmission mode and a second transmission mode and uses the control signal 11 of the microprocessor 1 to switch the mode, and uses the same output terminal and the same transmission line coupled to the driver through the line driver 6 to control, feed back and transmit the serial servomotor ID code (ID CODE), phase change signal (U, V, W) 3, and rotor operating signal (A, B, Z) to the driver at an appropriate different signal transmission time.

Figure 5:
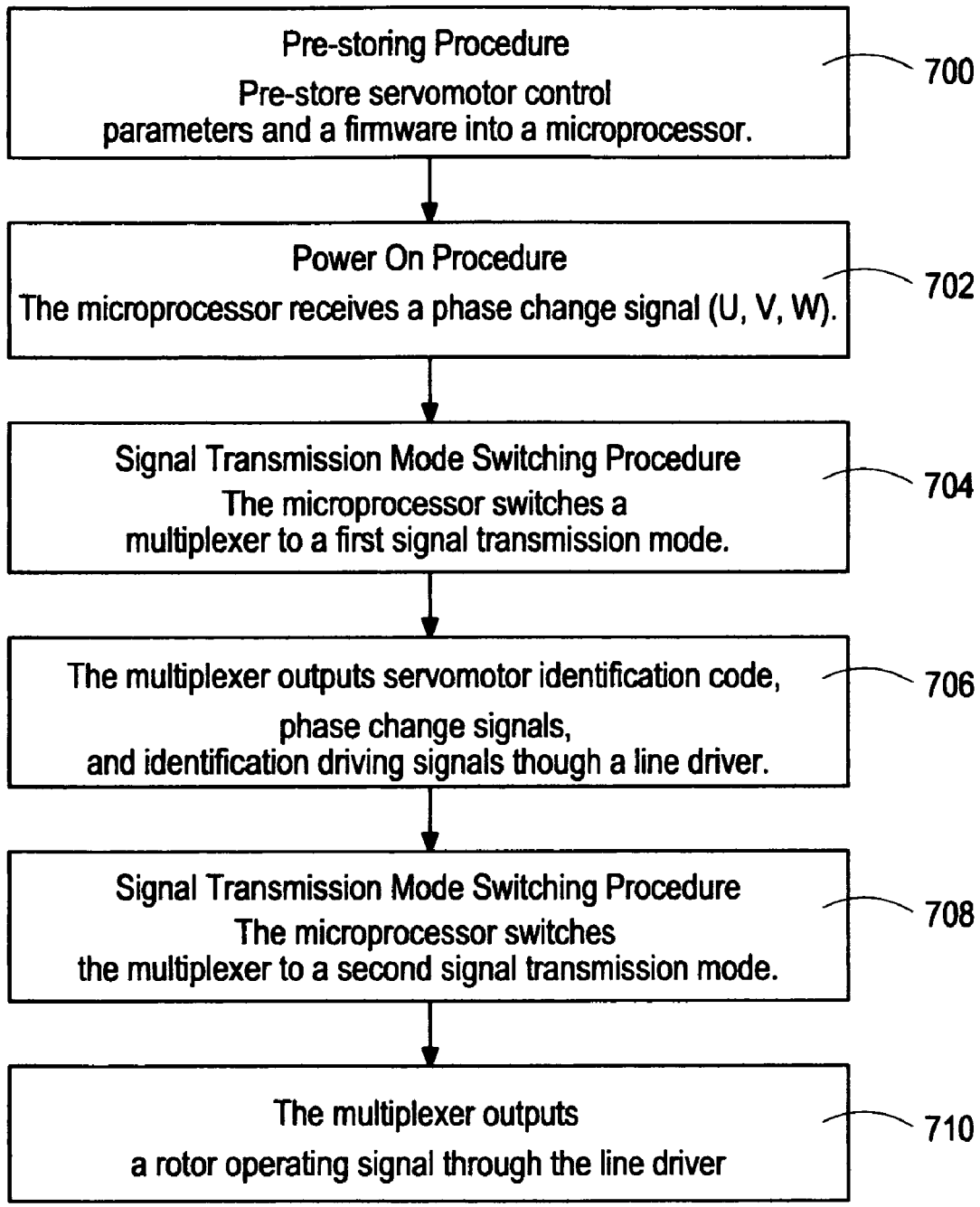
FIG. 5 is a flow chart of a preferred embodiment of the present invention.
Figure 6:
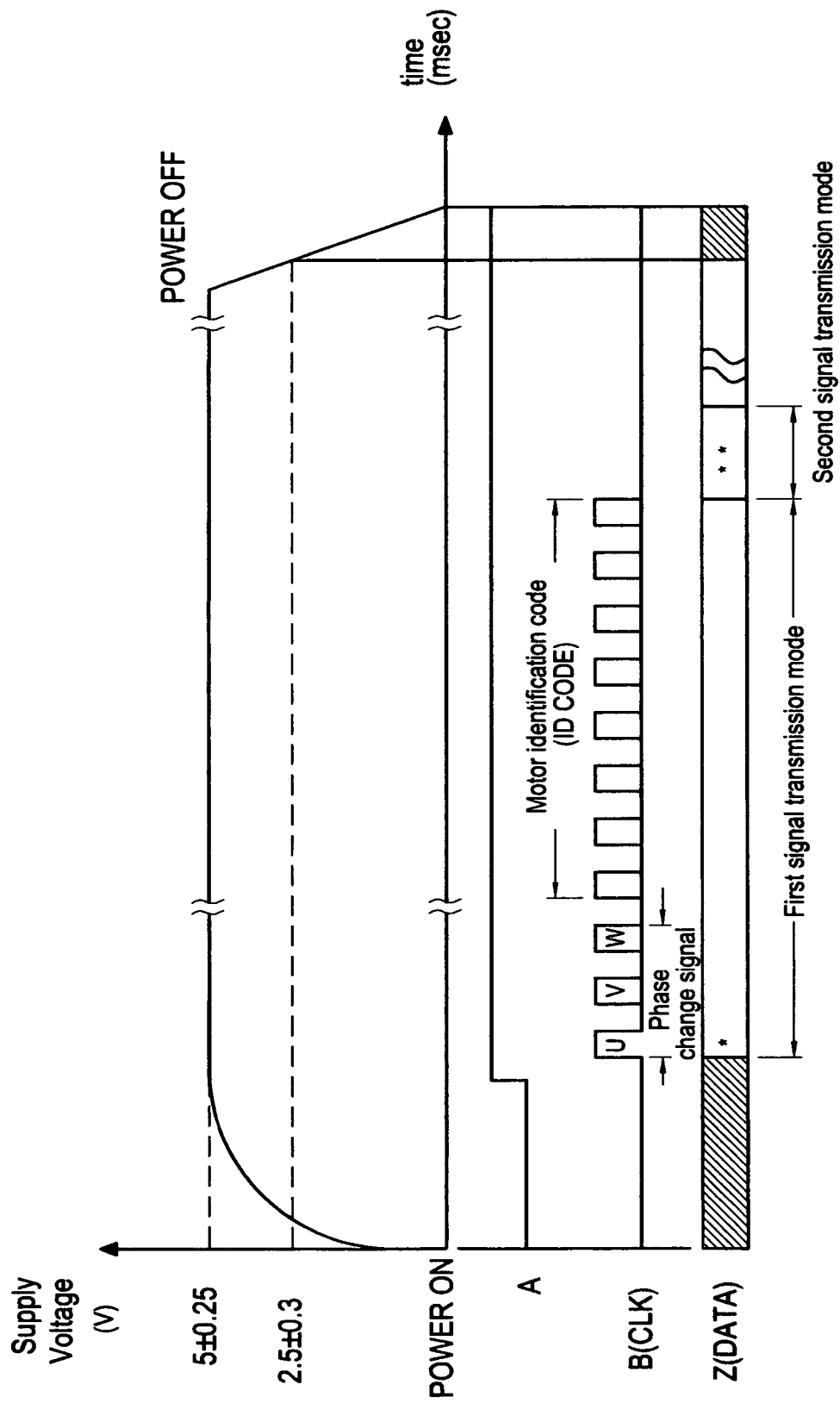
FIG. 6 is a timing chart of signals of a preferred embodiment of the present invention.

According to the optical encoder and its processing circuit of the aforementioned circuit architecture, the signal control method for the servomotor identification information and feedback signals are illustrated by a flow chart as shown in FIG. 5 and a timing chart as shown in FIG. 6. In FIGS. 5 and 6, the signal transmission control method for a wire-saving optical encoder having servomotor identification information in accordance with the present invention comprises the steps of:

(Step 700) pre-storing a plurality of servomotor control parameters and a firmware into a microprocessor by a burning process in a pre-storing procedure;

(Step 702) the microprocessor 1 receiving a phase change signal (U, V, W) outputted by an encoder in a power starting procedure;

(Step 704) the microprocessor 1 sending out a control signal 11 to switch the multiplexer 2 to a first transmission mode after the power is turned on for several hundreds of milliseconds in a signal transmission mode switch procedure;

(Step 706) the microprocessor 1 feeding back and transmitting serially combined data signals 13, servomotor ID code (ID CODE), phase change signals (U, V, W) and identification driving signals 5 through a line driver 6 in pairs to the driver by the multiplexer 2 in a set length of clock signal (CLK) 12;

(Step 708) the microprocessor 1 sending out a control signal 11 to the multiplexer 2 to switch the mode to a second transmission mode after the foregoing data signals 13 in a signal transmission mode switching procedure;

(Step 710) the multiplexer 2 feeding back and transmitting the rotor operating signal (A, B, Z) outputted from the encoder through the line driver 6 to the driver by using the same transmission line to transmit the signals in pairs.

Since the feedback signals of the foregoing encoder and its processing circuit also include the servomotor identification information, the driver reads the servomotor ID code (ID CODE) from the edge of each clock signal (CLK) 12 before the servomotor is started and collocates with the identification driving signal 5 to distinguish different models of motors. If a user connects an unmatched motor, the driver will display an error message. If the motor is matched, then the motor ID code (ID CODE) corresponding to a parameter for different models of servomotors will be read, so that a servomotor of a different model can match with an encoder with a different identification code, so as to facilitate the management and control of the servomotor. The servomotor ID code (ID CODE) can be created by firmware instead of hardware, and the contents of the servomotor ID code can be specified according to different requirements and flexibly changed without changing the hardware.

Further, the servomotor identification information and feedback control signals are sent out by the line driver 6, and the output transmission line is an 8-wire line. With this wire-saving arrangement, the driver can be compatible with a wire-saving servo encoder by simply changing the firmware without changing the hardware.

The present invention are illustrated with reference to the preferred embodiment and not intended to limit the patent scope of the present invention. Various substitutions and modifications have suggested in the foregoing description, and other will occur to those of ordinary skill in the art. Therefore, all such substitutions and modifications are intended to be embraced within the scope of the invention as defined in the appended claims.

What is claimed is:

1. A wire-saving optical encoder having servomotor identification information, comprising an optical transmitter, an optical receiver, rotary coding disc, fixed coding plate, a processing circuit and a mechanical body, and the processing circuit comprising:

a microprocessor, for receiving a phase change signal (U, V, W) outputted from an encoder, and producing a servomotor ID code (ID CODE) internally;

a multiplexer, for receiving an output signal of the microprocessor and a rotor operating signal (A, B, Z) outputted by the encoder;

an identification driving signal coupled to an input terminal of the multiplexer for inputting signals;

wherein the microprocessor outputs a signal to control the multiplexer to switch a signal transmission mode and collocate with the identification driving signal to transmit the produced servomotor ID code (ID CODE) and the phase change signal (U, V, W) by a serial output mode and then switch the transmission mode after the signals are transmitted, and a same signal transmission line continues transmitting the rotor operating signal (A, B, Z).

2. The wire-saving optical encoder having servomotor identification information of claim 1, wherein the processing circuit further comprises a line driver and a driver coupled to an output terminal of the multiplexer for connecting an 8-wire transmission line that includes a power input and a pairing feedback signal output.

3. The wire-saving optical encoder having servomotor identification information of claim 1, wherein the microprocessor is a microcontroller (MCU) or a digital signal processing (DSP) microprocessor.

4. The wire-saving optical encoder having servomotor identification information of claim 3, wherein the microprocessor pre-stores a plurality of motor control parameters by a burning technology and a procedure and collocates with the built-in firmware to output the servomotor ID code.

5. The wire-saving optical encoder having servomotor identification information of claim 4, wherein the servomotor ID code is produced by a firmware according to the pres-stored servomotor control parameter and the servomotor ID code is a motor ID code transmitted from the multiplexer.

6. The wire-saving optical encoder having servomotor identification information of claim 1, wherein the microprocessor transmits an output signal to the multiplexer and the output signal includes a control signal, a clock signal (CLK) and a data signal (DATA).

7. The wire-saving optical encoder having servomotor identification information of claim 1, wherein the data signal (DATA) further comprises a data signal which is formed serially by a servomotor ID code encoded and produced by the firmware and the phase change signal (U, V, W) outputted from the encoder.

8. The wire-saving optical encoder having servomotor identification information of claim 1, wherein the multiplexer further comprises the setup of a first transmission mode and a second transmission mode, and the modes can be switched by a control signal of the microprocessor, such that at the first transmission mode, the identification driving signal feeds back and transmits the servomotor ID code (ID CODE) and the phase change signal (U, V, W); at the second transmission mode, the same signal transmission line transmits the rotor operating signal (A, B, Z).

9. A method for feeding back a servomotor identification information of a wire-saving optical encoder, comprising the steps of:
  pre-storing a plurality of servomotor control parameters and a firmware into a microprocessor by a burning process in a pre-storing procedure;
  the microprocessor receiving a phase change signal (U, V, W) outputted by a phase change signal output element in a power-on procedure;
  the microprocessor outputting a control signal to switch the multiplexer at a first transmission mode, and collocate with the identification driving signal and the clock signal (CLK) to feed back the servomotor ID code and the phase change signal (U, V, W) to the driver through the line driver;
  the microprocessor further outputting a control signal to switch the multiplexer at a second transmission mode to receive a rotor operating signal (A, B, Z) outputted by the encoder and feed back an output to the driver through the same transmission line of the line driver.

10. The method for feeding back a servomotor identification information of a wire-saving optical encoder of claim 9, wherein the motor identification code and the phase change signal (U, V, W) are outputted serially.

* * * * *